A. S. Maxwell,
Meal Bin.

№ 111,363. Patented Jan. 31. 1871.

Witnesses:
P. C. Dieterich
L. S. Abbee

Inventor:
A. S. Maxwell
per
Attorneys.

United States Patent Office.

ALONZO S. MAXWELL, OF DIXON, ILLINOIS.

Letters Patent No. 111,363, dated January 31, 1871.

IMPROVEMENT IN COVERS FOR BINS.

The Schedule referred to in these Letters Patent and making part of the same.

*To all whom it may concern:*

Be it known that I, ALONZO S. MAXWELL, of Dixon, in the county of Lee and State of Illinois, have invented a new and useful Improvement in Bin-Covers; and I do hereby declare that the following is a full, clear, and exact description thereof, which will enable others skilled in the art to make and use the same, reference being had to the accompanying drawing forming part of this specification.

This invention relates to improvements in the bin-covers made in the form of a segment of a circle and moving in circular lines in opening and closing; and It consists in the construction and arrangement of parts, as hereinafter described.

The invention also consists in the application to the bins of casings to prevent the contents of the bins working between the arms and the walls thereof; also a packing to exclude it from the space between the cover and the top of the case.

Figure 1:
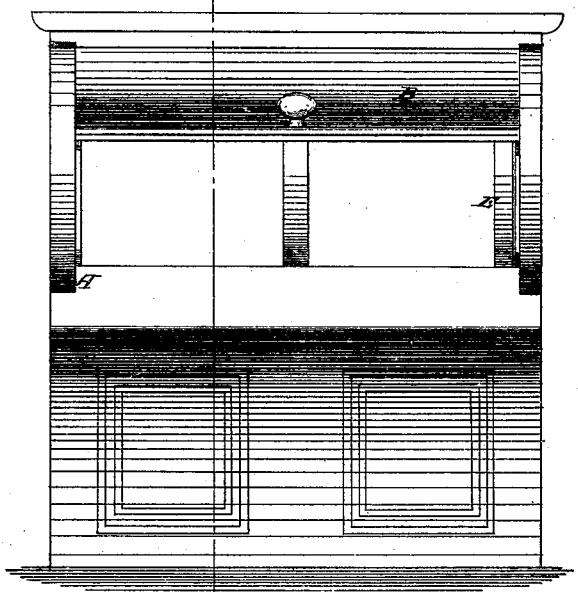
Figure 2:
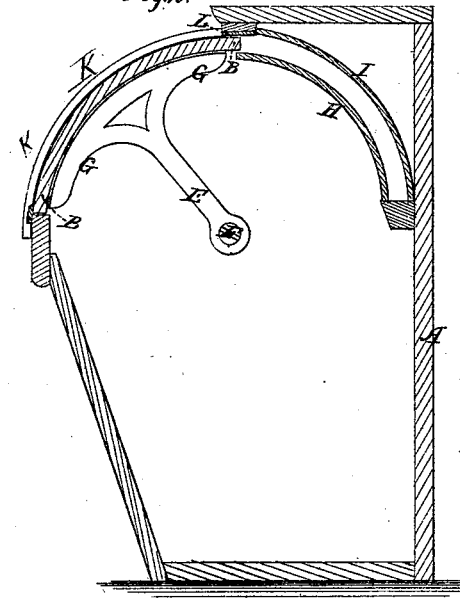

Figure 1 is a front elevation of a bin, the cover of which is arranged according to my improvements, and Figure 2 is a transverse section of the same on the line *x x* of fig. 2.

Similar letters of reference indicate corresponding parts.

A is the box or bin.

B, the segmental cover.

E represents the arms pivoted in the axis of the circle around which the cover swings at F.

These arms I provide with the curved heads or braces G, as long as the cover is wide, and I attach the cover thereto so as to be firmly braced at each side of the center, and these arms and braces I make of metal, all in one piece, preferably castings.

To exclude the flour, ground coffee, or other substance contained in the bin from the cover, I provide the inner casings H and the outer casings I, the same being arranged as shown, and for keeping it away from the arms I provide the casing K, which in this example is only shown on one end; but in practice I propose to arrange similar casings at both ends.

Above the cover, and on the lower side of the casing I, I arrange a strip of cloth or other packing, L, for the more effectually excluding the dust and other fine matters from the space.

A similar packing-strip may be arranged on the upper edge of the lower casing.

Having thus described my invention,

I claim as new and desire to secure by Letters Patent—

The combination, with the case and the cover B, provided with arms E and braces G, made in one piece, of the casings H I K and packing-strips L, all as shown and described.

ALONZO S. MAXWELL.

Witnesses:
JAMES S. CAMP,
A. C. BARDWELL.